March 11, 1924.
F. D. RUCKMAN
1,486,803
METHOD OF CONNECTING STORAGE BATTERIES FOR ELECTROLYTIC FORMATION
Filed Jan. 17, 1921
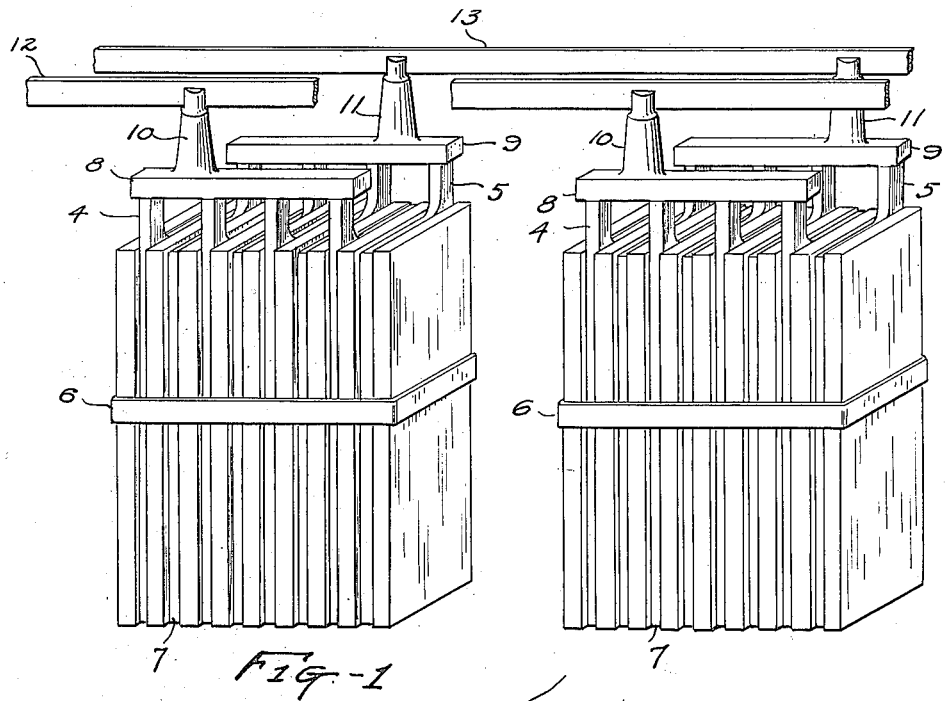
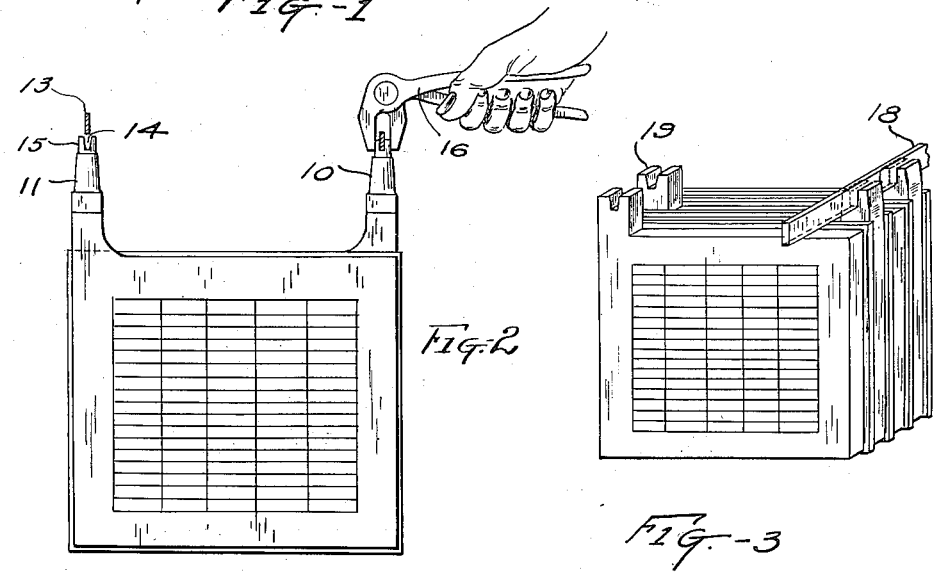
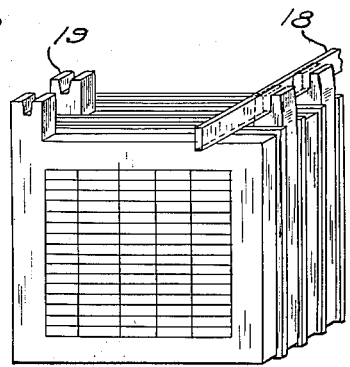
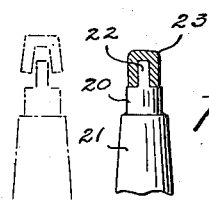
INVENTOR
Fred D. Ruckman
By Bates & Macklin,
ATTORNEYS Patented Mar. 11, 1924.

1,486,803

UNITED STATES PATENT OFFICE.

FRED D. RUCKMAN, OF CLEVELAND, OHIO.

METHOD OF CONNECTING STORAGE BATTERIES FOR ELECTROLYTIC FORMATION.

Application filed January 17, 1921. Serial No. 437,686.

*To all whom it may concern:*

Be it known that I, FRED D. RUCKMAN, a citizen of the United States, residing at Cleveland, in the county of Cuyahoga and State of Ohio, have invented a certain new and useful Improvement in Methods of Connecting Storage Batteries for Electrolytic Formation, of which the following is a full, clear, and exact description, reference being had to the accompanying drawings.

This invention relates to terminal posts for storage batteries and is directed more particularly to the provision of novel means for securing electrical conductors to the terminals.

The general object of the invention is to provide a terminal connection on battery elements to be used when forming the battery plates. A more specific object is to provide means for connecting the positive and negative terminals to the respective bus-bars during the formative period of the battery elements which can be quickly and simply made without resorting to the expedient of burning the connection on, as has been the practice heretofore.

A further purpose of this invention is to provide bus-bar connections on the terminals of a series of battery elements wherein relative uniform conductivity may be attained by simply pressing the ends of the terminals against the bus-bars, and which may be readily broken without marring or disfiguring the battery terminals. It has been the general practice heretofore, when connecting a number of battery elements to bus-bars for the formation thereof, to either burn the bus-bars to the terminals or resort to the use of screw clamps, either of which leaves the terminal in a disfigured condition after the battery elements are removed from the forming jars.

The above mentioned objects will be seen to be attained by that embodiment of my invention described in the following specification in connection with the accompanying drawings, the essential characteristics being summarized in the claims.

In the drawings, Fig. 1 is a representation of my method of forming battery elements by connecting the positive and negative terminals of a proper number of elements to bus-bars which lead from an ordinary 220 volt service line; while Fig 2 is a front elevation of the battery elements showing the relative size of the bus-bars to the terminal, and Fig. 3 is a perspective view similar to Fig. 1, in which the individual plates, however, are shown as being connected directly to bus-bars. Fig. 4 shows an alternate construction of a terminal and bus-bar hereinafter described.

Referring to the various parts by numbers, in Fig. 1 the usual positive plates 4 and negative plates 5 are shown retained in assembled relation by an elastic band 6, and separated and insulated from each other by the separators 7. The positive and negative plates being respectively connected by means of connecting members 8 and 9 having terminals 10 and 11 integral therewith. This is the usual method of assembly of elements during the forming period. It is the custom to place these elements in forming jars during which time the positive terminals are connected to a common bus bar 12 and the negative terminals are connected to a bus bar 13 by burning a lead joint between the bars and terminals or by the use of a screw clamp. In the former method considerable time and skill is required in making the connection, while in the latter method the degree of contact is not usually uniform, with the consequence that some of the elements receive a greater degree of formation than the others.

I have found that by having tapered slots in the connecting end of the terminal posts such as is shown at 14, Fig. 2, it is possible to insert the bus-bars therein and obtain a proper and a uniform contact on all of the terminals by simply forcing the small portion 15 of the terminal posts against the sides of the bus bar by means of a tool, such as is shown at 16. By using such a tool in obtaining this connection the workman is enabled to develop the proper sense of feel so as to apply the same amount of pressure on the sides of each terminal when connecting the same as he may readily acquire sufficient skill when performing this simple operation to exert the same degree of pressure upon the plier handles.

I have also found that sufficient pressure can be brought to bear upon the sides of the slotted portion of the terminal to obtain the correct connection without marring the end thereof.

After the elements have been properly formed the bus bars may be removed from contact therewith by simply drawing the bars out of contact with the terminal post without causing any undue distortion thereof.

It is sometimes desirable to form the individual, positive and negative plates without having them in assembled relation, as shown in Fig. 1. In Fig. 3 I have, therefore, shown the use of this method in connecting individual plates in which the bus-bar 18 may be connected to terminal lugs 19 in a manner similar to the method used in connecting the terminal post, as shown in Fig. 2.

In Fig. 4 I have shown an alternate construction of a bus-bar and terminal post which may be readily connected by the means as illustrated in Fig. 2. In this construction the end 20 of the terminal 21, is formed to have a flat projection 22 and a U-shaped bus-bar 23 is adapted to be pressed into intimate contact therewith.

From the foregoing description of my invention, it is to be understood that I have simplified one of the essential steps in the manufacture of storage batteries, wherein the terminal posts have usually been connected during the formative period of the plates by burning the connection thereon, or by using various mechanical contrivances which were not of sufficient sensitiveness to permit the workman to use his discretion in obtaining a uniform degree of contact pressure on all of the terminals, which is essential in the proper formation of battery elements.

It is to be seen further that by the use of my method an additional advantage is obtained in that the bus-bars may be disconnected from the terminal post without necessitating the expenditure of time in straightening marred terminal posts, or by cutting or removing lead particles adhering thereto, such as is necessary when using other methods after disconnecting battery elements from the bus bars.

I claim:—

1. In a storage battery, a terminal post extending upwardly from the battery plates, said post having an intermediate portion affording contacting means for connecting the battery to an ignition system conductor terminal and an upper bifurcated portion formed of permanently deformable metal affording a connection for a bus bar during a battery plate charging period.

2. The method of manufacturing and charging a series of storage battery plates wherein the positive and negative terminals of the plates are connected to bus bars which includes the steps of casting terminal posts to obtain bifurcated upper ends thereon, autogeneously welding the terminal posts to the plates and connecting the welded plates to the bus bars by compressing and deforming the bifurcated portion of the terminal post whereby connections of intimate contact are formed between the bus bars and the terminal posts without resorting to lead burning or welding.

3. The method of manufacturing and charging a series of storage battery plates wherein the positive and negative terminal elements of the plates are connected to bus bars including the steps of compressing portions of the terminal post into contact with the bus bars by placing the bus bars in recesses formed in the posts and deforming those portions of the terminal post adjacent the recess whereby intimate contact is made between the bus bars and the terminal posts.

4. The method of manufacturing storage battery plates during the asembling and plate forming process which includes the steps of casting terminal posts having intermediate contact portions affording contacting means for connecting the posts when in the completely assembled battery to an ignition system conductor terminal while forming an upper recessed portion upon the post of permanently deformable metal, autogeneously welding the terminal post to positive and negative battery plates, assembling a set of positive plates in a battery element relation to a set of negative plates, connecting the respective posts of said set of plates to positive and negative bus bars during the paste forming period by placing the positive and negative bus bars in the recesses of the respective posts, and deforming the upper portions of the posts adjacent said bus-bar receiving recesses whereby intimate contact is formed between the constructed posts and the connected bus bars.

In testimony whereof, I hereunto affix my signature.

FRED D. RUCKMAN.